United States Patent
Xu et al.

(10) Patent No.: US 7,078,445 B2
(45) Date of Patent: *Jul. 18, 2006

(54) PHOTOSENSITIVE ACRYLATE COMPOSITION AND WAVEGUIDE DEVICE

(75) Inventors: Chuck C. Xu, Tewksbury, MA (US); Deepti Pant, Woburn, MA (US); Chris E. Osuch, Mine Hill, NJ (US); Louay A. Eldada, Lexington, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/050,186

(22) Filed: Jan. 18, 2002

(65) Prior Publication Data

US 2002/0106582 A1    Aug. 8, 2002

Related U.S. Application Data

(60) Provisional application No. 60/265,765, filed on Feb. 1, 2001.

(51) Int. Cl.
*C08F 20/22*    (2006.01)
*C08F 2/46*    (2006.01)
*G03C 1/73*    (2006.01)

(52) U.S. Cl. .............. 522/172; 522/180; 522/181; 522/182; 526/243; 526/246; 526/245

(58) Field of Classification Search ............. 522/179, 522/181, 182, 172, 180; 385/123, 129, 132, 385/145, 143; 526/243, 245, 246
See application file for complete search history.

(56) References Cited

U.S. PATENT DOCUMENTS

| | | | |
|---|---|---|---|
| 3,779,627 A | 12/1973 | Pinnow et al. | |
| 4,138,194 A | 2/1979 | Beasley et al. | |
| 4,609,252 A | 9/1986 | Wong et al. | |
| 4,877,717 A | 10/1989 | Suzuki et al. | |
| 5,022,737 A * | 6/1991 | Yamamoto et al. | 385/145 |
| 5,054,872 A | 10/1991 | Fan et al. | |
| 5,062,680 A | 11/1991 | Imamura et al. | |
| 5,136,682 A | 8/1992 | Moyer et al. | |
| 5,396,350 A | 3/1995 | Beeson et al. | |
| 5,402,514 A | 3/1995 | Booth et al. | |
| 5,462,700 A | 10/1995 | Beeson et al. | |
| 5,481,385 A | 1/1996 | Zimmerman et al. | |
| 5,822,489 A | 10/1998 | Hale | |
| 6,005,137 A | 12/1999 | Moore et al. | |
| 6,023,545 A | 2/2000 | Eldada et al. | |
| 6,114,090 A | 9/2000 | Wu et al. | |
| 6,162,579 A | 12/2000 | Stengel et al. | |
| 6,306,563 B1 | 10/2001 | Xu et al. | |
| 6,428,893 B1 * | 8/2002 | Barraud et al. | 428/392 |
| 6,496,637 B1 * | 12/2002 | Blomquist et al. | 385/129 |
| 6,542,684 B1 * | 4/2003 | Eldada et al. | 385/129 |
| 6,689,900 B1 * | 2/2004 | Wang et al. | 560/182 |
| 6,711,336 B1 * | 3/2004 | Blomquist et al. | 385/129 |
| 2002/0006586 A1 * | 1/2002 | Xu et al. | 430/321 |
| 2002/0111518 A1 * | 8/2002 | Wang et al. | 568/615 |

(Continued)

*Primary Examiner*—Susan Berman

(57) ABSTRACT

A photosensitive composition suitable for practical waveguide devices is provided. The photosensitive composition comprises at least one multifunctional acrylate prepared from a fluorinated multifunctional alcohol and at least one photoinitiator. The said composition has high photo contrast, high curing speed, controllable refractive index, low curing shrinkage, high thermo-optic coefficient, low volatility and high viscosity. A waveguide device is formed by patterning the photosensitive composition.

8 Claims, 1 Drawing Sheet

U.S. PATENT DOCUMENTS

2002/0115820 A1* 8/2002 Wang et al. ................ 528/401
2002/0122647 A1* 9/2002 Blomquist et al. .......... 385/129
2002/0136526 A1* 9/2002 Pottebaum et al. ......... 385/143
2003/0108326 A1* 6/2003 Blomquist et al. .......... 385/143

* cited by examiner

PHOTOSENSITIVE ACRYLATE COMPOSITION AND WAVEGUIDE DEVICE

PRIORITY INFORMATION

This application claims priority from provisional application Ser. No. 60/265,765 filed Feb. 1, 2001.

BACKGROUND OF THE INVENTION

1. Field of the Invention

This invention relates to a photosensitive composition containing at least one fluorinated multifunctional acrylate or methacrylate, collectively referred to herein as acrylate, and a waveguide device fabricated with the said composition. This acrylate composition demonstrates excellent coating, fast cure, high photo contrast, low optical absorption loss in the telecommunication wavelength region of 1300–1610 nm, low birefringence, high thermo-optic (TO) coefficient and high thermal stability. The waveguide device is useful for fiber optic telecommunication networks, which use single mode optical waveguides to interconnect various fiber optic devices as well as optical fibers.

2. Description of the Prior Art

A waveguide is a planar structure comprising a high refractive index material in the core and low refractive index materials in the cladding that surrounds the core. The core geometry and the refractive index difference between the core and the cladding determine the waveguide's optical characteristics such as its mode size. The waveguide can be in any form or shape depending on its end use. The waveguides used for telecommunications applications can be used to produce various components intended to interface with fiber-optic networks such as thermo-optic switches, splitters, combiners, couplers, filters, tunable filters, attenuators, wavelength cross connects, channel monitors and add-drop multiplexers. The fiber optic applications require that the materials and their waveguide devices meet many specifications such as low optical insertion loss in the useful wavelength region of 1300–1610 nm, high TO coefficient (|dn/dT|), low birefringence and high reliability. This is challenging and requires a unique material and device approach to meet all the requirements.

It is known in the art that a photosensitive composition can be patterned by an actinic radiation such as UV light, e-beam and X-ray to produce waveguides. One method used to form waveguides involves the application of standard photolithographic processes. Using the photolithographic process, an image is projected from a mask onto a photosensitive layer carried upon a substrate. Among the many known photosensitive polymers, acrylate materials have been widely studied as waveguide materials because of their optical clarity and low birefringence. The details of the prior art are described in U.S. Pat. Nos. 4,609,252; 4,877,717; 5,054,872; 5,136,682; 5,396,350; 5,402,514; 5,462,700; 5,481,385; 6,023,545 and 6,114,090, which are incorporated herein by reference.

Although the prior art teaches how to fabricate waveguides with photopolymers, practicing of the art has not led to devices that meet all the requirements for practical use in telecommunication networks. Typical prior art devices use hydrocarbon materials that have very high absorption loss in the spectral region from 1,300 to 1,610 nm. Also prior art devices use materials that have high shrinkage upon curing, leading to high residual stress and hence high scattering loss. All these losses lead to devices that have unacceptably high insertion loss.

To achieve low insertion loss it is necessary to simultaneously realize low absorption and scattering losses of the waveguides in the telecommunication wavelength region of 1,300–1,610 nm and low coupling loss between the waveguides and their pigtailed fibers. To realize low absorption loss it is required to use materials that have low absorption at 1,300–1,610 nm. To realize low scattering loss it is required to use materials and device fabrication processes that allow for homogeneity and minimize stress. To realize low coupling loss it is required that waveguides match optical fibers in both cross section and mode size. To realize the matched cross section and mode size, high contrast materials are utilized to control the waveguide size as well as the capability to control refractive indexes of the materials.

Prior art references such as U.S. Pat. Nos. 3,779,627; 4,138,194; 5,062,680; 5,822,489 and 6,005,137, which are herein incorporated by reference, have taught that replacing hydrogen-carbon bonds with fluorine-carbon bonds or deuterium-carbon bonds will reduce the absorption loss of an organic material in the near IR wavelength region of 1,300–1,610 nm. Replacing hydrogen with fluorine in a material also decreases the refractive index of the material.

Some fluorinated acrylate compositions disclosed in the prior art contain low molecular weight or mono-functional acrylates. There are several drawbacks to such materials. First of all, the monomers do not have the minimum viscosity required to form a uniform coating with sufficient thickness. Second, the high volatility of low molecular weight monomers impairs production of waveguides and other coatings. The highly volatile monomers not only contaminate the curing chamber but also make it extremely difficult to achieve consistent material properties, including refractive index, after curing. Third, the low molecular weight of the monomers leads to very high shrinkage (up to 20%) upon curing. This high shrinkage causes high residual stress. Fourth, it is difficult to fully cure mono-functional monomers with UV light. The residual monomer will cause reliability and environmental problems.

The urethane linkage has been used to extend the molecular chain of fluorinated acrylates to increase molecular weight and viscosity. This is intended to overcome the abovementioned problems. However, because of the presence of the N—H bond, a urethane group absorbs moisture and has strong absorption from 1300 to 1600 nm. Hence the urethane group is unsuitable for applications requiring low optical loss at near IR wavelengths. Likewise, the urethane group is inappropriate for applications requiring moisture resistance.

In addition to the above-mentioned requirements, thermo-optic (TO) devices such as TO switches, variable optical attenuators and tunable filters require high TO coefficient (|dn/dT|) to reduce power consumption and increase tuning range. The TO coefficient (|dn/dT|) is the change in refractive index, n, of a material induced by a change in temperature, T. For tunable grating devices a more useful term, dλ/dT, which defines the tuning efficiency of a grating, is used. For a typical organic polymer the change in refractive index with temperature in the 1300–1610 nm wavelength region is mainly caused by its density change with temperature. When the polymer material is heated it expands and its density decreases, leading to the decrease of its refractive index. Consequently dn/dT is negative.

Low birefringence is also important to minimize signal distortion and polarization dependent loss (PDL) of a waveguide device. It is known in the art that one way to reduce birefringence is to use an isotropic material with low stress and strain optic coefficients.

Therefore there is a need for an acrylate composition having high viscosity, low volatility, low absorption in the wavelength region from 1300 to 1610 nm, high TO coefficient, low birefringence and low shrinkage upon curing.

SUMMARY OF THE INVENTION

A photosensitive composition suitable for practical waveguide devices comprises at least one fluorinated multifunctional acrylate and at least one photoinitiator. The said composition has high photo contrast, high curing speed, controllable refractive index, low curing shrinkage, low volatility and high viscosity.

Another object of this invention is to provide a waveguide device formed by patterning the photosensitive composition of this invention. The said waveguide device has low optical insertion loss at 1,300–1,610 nm, high TO coefficient, low birefringence, excellent chemical and thermal stability and good mechanical flexibility.

BRIEF DESCRIPTION OF THE DRAWINGS

Other objects, features and advantages of the present invention will become apparent in light of the following detailed description in connection with the accompanying drawings, wherein.

DETAILED DESCRIPTION OF THE PREFERRED EMBODIMENTS

Figure 1A:
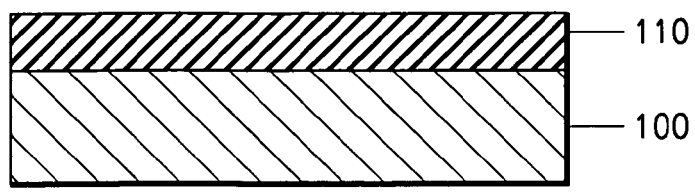
FIGS. 1a–e illustrates a schematic of the fabrication of a waveguide.

The photosensitive composition of the present invention comprises:
  a) at least one fluorinated, non-urethane containing multifunctional acrylate prepared from at least one multifunctional alcohol, said at least one alcohol being synthesized from a core molecule having at least two equivalents of hydroxy-reacting functional groups and a fluorinated molecule containing at least two hydroxyl groups; and
  b) at least one photoinitiator that generates free radicals upon exposure to sufficient actinic radiation.

Other acrylates may be used to tailor the properties of the composition such as refractive index and viscosity. The composition comprises 95–99.99 wt % of total acrylates and 0.01–5 wt % of photoinitiator. Preferably the composition comprises 98–99.9 wt % of total acrylates and 0.1–2 wt % of photoinitiator.

At least one acrylate used in this embodiment is synthesized using the following non-exclusive reaction scheme:

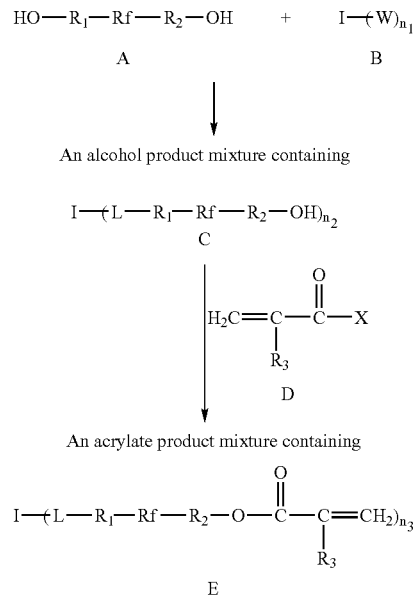

wherein A is a fluorinated monomer or polymer having two hydroxyl groups, wherein Rf is a perfluorinated moiety; B is a multifunctional molecule having a core I wherein W stands for one equivalent of hydroxy-reacting functional group and $n_1$ is at least 2; C is the product mixture from A and B, wherein L is an ether or ester link and $n_2$ is at least 2 and preferably 3–6; D is an acrylic acid, an acrylic ester or acryloyl chloride; and E is the acrylate product mixture from C and D, wherein $R_3$ is H or $CH_3$ and $n_3$ is at least 2.

When synthesizing C from A and B, the ratio of A to B is controlled so that there is sufficient amount of alcohol A to prevent gelling and to form hydroxy terminated polymer molecules. It is preferred that there are 1.5–12.0, more preferably 2.0–8.0, and most preferably 2.5–5.0 equivalents of OH groups from A for each equivalent of hydroxy-reacting group, W, from B. One equivalent of W herein means the amount of W required to consume one hydroxyl group. For example a carboxylic acid group has one equivalent of hydroxy-reacting group while an anhydride group has two equivalents of hydroxy-reacting groups. The molecular weight, molecular weight distribution and viscosity of the product can be tailored by changing the A/B ratio as will be understood by those skilled in the art.

It is noteworthy that the mono-core molecular structure given in the product C is the simplest form of the fluorinated multifunctional alcohol of the present invention. The alcohol product mixture of the present invention may contain one or more structures resulting from di-, tri- or poly-condensation of A and B. Such structures may contain 2, 3 or more core, I, units. Likewise, in addition to the mono-core structure shown in E, the acrylate mixture produced may contain one or more structures containing 2, 3 or more core, I, units. Their molecular weight distribution and molecular structure depend on the ratio between A and B as well as the reaction conditions. The following generalized structures give examples of mono-core and poly-core alcohol or acrylate molecules. These structures arise for four different values of n.

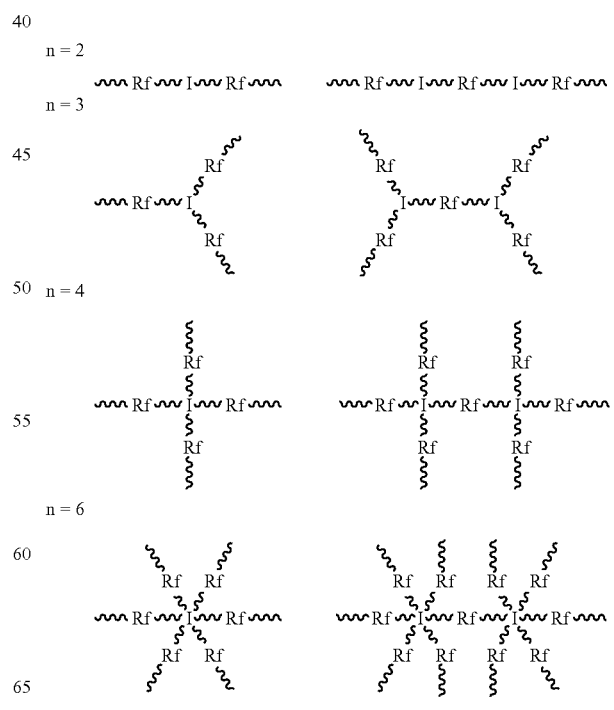

It is preferred that each free end of Rf is terminated with a hydroxyl and acrylate group for the multifunctional alcohols and acrylates, respectively. The multifunctional alcohol product mixture C may also contain residual A. A can either be removed or retained in the alcohol product mixture before C is converted to the acrylate product mixture E.

Specifically, A is a fluorinated diol, wherein Rf is a monomeric or polymeric perfluorinated alkylenediyl, alkylene oxide, arylenediyl, arylene oxide, and mixtures thereof; $R_1$ and $R_2$ are monomeric or polymeric divalent moieties such as alkylenediyl, alkylene oxide, alkylene sulfide, arylenediyl, arylene oxide, arylene sulfide, siloxane, and mixtures thereof. Examples of suitable fluorinated diols include, but are not limited to, 1H, 1H, 9H, 9H-perfluoro-1,9-nonanediol, 1H, 2H, 3H, 3H-perfluorononane-1,2-diol, 1H, 1H, 10H, 10H-perfluoro-1,10-decanediol, 1H, 1H, 12H, 12H-perfluoro-1,12-dodecanediol, 1H, 1H, 16H, 16H-perfluoro-1,16-hexadecanediol, 1H, 1H, 8H, 8H-perfluorotetraethyleneglycol, fluoropoly(alkylene) diol, ethoxylated fluoropoly(alkylene) diols, fluoropoly(alkylene oxide) diols having the following structures:

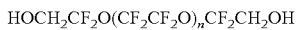

$HOCH_2CF_2O(CF_2CF_2O)_nCF_2CH_2OH$

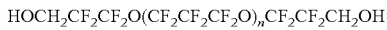

$HOCH_2CF_2CF_2O(CF_2CF_2CF_2O)_nCF_2CF_2CH_2OH$

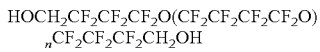

$HOCH_2CF_2CF_2CF_2O(CF_2CF_2CF_2CF_2O)$
$_nCF_2CF_2CF_2CH_2OH$

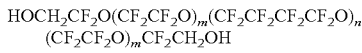

$HOCH_2CF_2O(CF_2CF_2O)_m(CF_2CF_2CF_2CF_2O)_n$
$(CF_2CF_2O)_mCF_2CH_2OH$ and

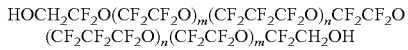

$HOCH_2CF_2O(CF_2CF_2O)_m(CF_2CF_2CF_2O)_nCF_2CF_2O$
$(CF_2CF_2CF_2O)_n(CF_2CF_2O)_mCF_2CH_2OH$ wherein m and n are integers, perfluoropolyether diols such as Fluorolink D and D10, commercially available from Ausimont USA, ethoxylated perfluoropolyether diols such as Fluorolink E and E10, also commercially available from Ausimont USA and other variations known to those skilled in the art.

B is a multifunctional "core" molecule, wherein I is an aliphatic or aromatic moiety, W is a hydroxy-reacting functional group, such as a carboxylic acid and an alkyl halide, and n is at least 2 and preferably 3–6. B can be chosen to tailor the molecular structure and properties of C and E such as refractive index, crosslinking density, viscosity, etc. When B reacts with A a new linkage L is formed. L can be either an ester or ether link depending on the type of the functional group W.

To obtain an ester link, B is chosen from multifunctional carboxylic compounds such as carboxylic acids, acid chlorides, anhydrides, esters and other compounds known to those skilled in the art. These compounds react with excess diols, A, to form polyesters, C, with hydroxyl end groups. Suitable "core" compounds, B, include but are not limited to multifunctional acids such as malonic acid, succinic acid, glutaric acid, bromosuccinic acid, meso-2,3-dibromosuccinic acid, tetrafluorosuccinic acid, hexafluoroglutaric acid, perfluorosuberic acid, 1,3-cyclohexanedicarboxylic acid, 1,4-cyclohexanedicarboxylic acid, phenylmalonic acid, benzylmalonic acid, phenylsuccinic acid, 3-phenylglutaric acid, 1,3-phenylenediacetic acid, 1,4-phenylenedipropionic acid, 2-carboxycinnamic acid, 1,4-phenylenediacrylic acid, 4,4'-(hexafluoroisopropylidene)-bis(benzoic acid), 4,4'-oxybisbenzoic acid, terephthalic acid, 4,5-dichlorophthalic acid, tetrafluoroterephthalic acid, 4,4'-biphenyldicarboxylic acid, 1,4-naphthalenedicarboxylic acid, 2,6-naphthalenedicarboxylic acid, 1,8-naphthalenedicarboxylic acid, tricarballylic acid, cis-aconitic acid, trans-aconitic acid, citric acid, 1,3,5-cyclohexanetricarboxylic acid, Kemp's triacid, 1,2,3-benzenetricarboxylic acid, 1,2,4-benzenetricarboxylic acid, 1,3,5-benzenetricarboxylic acid, 5-(4-carboxy-2-nitrophenoxy)-isophthalic acid, 1,2,3,4-butanetetracarboxylic acid, tetrahydrofuran-2,3,4,5-tetracarboxylic acid, 2,2',2",2"'-[1,2-ethanediylidene-tetrakis(thio)]-tetrakisacetic acid, cyclobutanetetracarboxylic acid, 1,2,4,5-benzenetetracarboxylic acid, mellitic acid, 1,4,5,8-naphthalenetetra-carboxylic acid and 1,2,3,4,5,6-cyclohexanehexacarboxylic acid; multifunctional esters such as methyl, ethyl or butyl esters of the above acids and triethyl methanetricarboxylate, triethyl 1,1,2-ethanetricarboxylate, tetraethyl 1,1,2,2-ethanetetracarboxylate, tetraethyl ethylenetetracarboxylate, tetramethyl exo,exo-tetracycloundeca-3,8-diene-3,4,8,9-tetracarboxylate and pentamethyl cyclopentadiene-1,2,3,4,5-pentacarboxylate; anhydrides such as succinic anhydride, methylsuccinic anhydride, maleic anhydride, citraconic anhydride, 2,3-dimethylmaleic anhydride, dichloromaleic anhydride, bromomaleic anhydride, 3,4,5,6-tetrahydrophthalic anhydride, 1,4,5,6,7,7-hexachloro-5-norbornene-2,3-dicarboxylic anhydride, phthalic anhydride, 4,5-dichlorophthalic anhydride, 3,6-dichlorophthalic anhydride, 3,6-difluorophthalic anhydride, tetrabromophthalic anhydride, tetrachlorophthalic anhydride, tetrafluorophthalic anhydride, diphenic anhydride, cis-aconitic anhydride, 1,2,4-benzenetricarboxylic anhydride, 1,2,4,5-benzenetetracarboxylic dianhydride and bicyclo[2,2,2]oct-7-ene-2,3,5,6-tetracarboxylic anhydride; and acid chlorides such as malonyl dichloride, dimethylmalonyl dichloride, succinyl dichloride, glutaryl dichloride, fumary chloride, itaconyl chloride, trans-3,6-endomentylene-1,2,3,6-tetrahydrophthaloyl chloride, triethyleneglycol bis(chlroformate), diglycoyl chloride, phthaloyl dichloride, isothaloyl dichloride, terephthaloyl chloride and 1,3,5-benzenetricarbonyl chloride.

To obtain an ether link, B is chosen from halides or other compounds that react with alcohols to form ethers such as those known to the skilled in the art. Non-exclusive examples of the halides include 1,4-dibromobutane, $\alpha,\alpha$-'+dichloro-o-xylene, $\alpha,\alpha'$-dibromo-o-xylene, $\alpha,\alpha'$-dichloro-m-xylene, $\alpha,\alpha'$-dibromo-m-xylene, $\alpha,\alpha'$-,2,3,5,6-hexachloro-p-xylene, 2,2'-bis(bromomethyl)-1,1'-biphenyl, 1,8-bis(bromomethyl)naphthalene, 1,3-dichloro-2-(chloromethyl)-2-methylpropane, 1,1,1-tris(chloromethyl)-propane, 2,4,6-tris(bromomethyl)mesitylene, pentaerythrityl tetrachloride, pentaerythrityl tetrabromide, 1,2,4,5-tetrakis (bromomethyl)-benzene, hexakis(bromomethyl)benzene The multifunctional alcohol mixture C reacts with D to form the multifunctional acrylate mixture E. In a preferred embodiment the fluorinated alcohol C is converted into an acrylate E with acryloyl chloride using a tertiary amine. Preferably a hindered tertiary amine containing at least one tertiary or quaternary carbon atom is used. The hindered amine provides several advantages, as compared to commonly used triethylamine, in reducing yellowness of the products and eliminating the water washing process normally needed to remove ammonium salts formed during the acryloylation reaction. Non-exclusive examples of suitable hindered amines include N,N-dimethylisopropylamine, N,N-diisopropylethylamine, triisobutylamine, Julolidine, iminodibenzyl, 2-methylpyridine, 2,6-lutidine, 2,4,6-collidine, and mixtures thereof.

It is preferred that the acrylates used in the composition of this invention have a number average molecular weight of at least 500 and more preferably at least 1000. The high molecular weight of the acrylate provides several advantages. First of all, the high molecular weight lowers shrinkage upon curing due to the relatively low volume fraction of the acrylate group. It is known in the art that low molecular weight acrylates can have shrinkage of up to 20% when cured, leading to high residual stress. High residual stress causes problems such as birefringence, delamination, cracking and high light scattering. The photosensitive composition of this invention has shrinkage of 5% or lower, preferably 2% or lower. Second, the high molecular weight corresponds with low volatility. Low volatility is important to reduce environmental and health risks and allow for a stable coating composition. Third, high molecular weight permits high viscosity. It is known in the art that a coating composition must have a minimum viscosity to yield high quality coatings with certain thickness. The photosensitive composition of this invention has a viscosity of at least 50 cP at 20° C.

In a more preferred embodiment the acrylates from E have at least three acrylate groups per molecule. These molecules have a core (I) that is connected to at least three fluorinated acrylate branches. Such molecules are star-shaped or hyper-branched. The star-shaped or hyper-branched molecule provides advantages such as good isotropy, which lowers birefringence, and high free volume, which favors high TO coefficient. It is noteworthy that one end of the fluorinated acrylate is pre-anchored to the core I. Such molecules allow for fast curing, high crosslinking density, and low shrinkage.

The photosensitive composition of the present invention provides a low Tg polymer after curing. The Tg of the cured composition is typically below 0° C. Low Tg polymers allow for high CTE and therefore high TO coefficient at the device working temperature which is typically maintained above 20° C. Another benefit of low Tg polymers, especially of cross-linked polymers, is mechanical flexibility. It is known in the art that a cross-linked polymer exhibits rubbery behavior above its Tg. This rubbery behavior is desirable for waveguide devices by reducing residual stress and stress-induced scattering optical loss. The photosensitive composition of this invention has typical TO coefficient, $|dn/dT|$, of about $3.1 \times 10^{-4}/°$ C. and $d\lambda/dT$ of about $-3.6$ nm/° C.

The photosensitive composition comprises at least one photoinitiator that generates free radicals upon exposure to an actinic radiation. The chosen photoinitiator is preferably thermally inactive below about 50° C. Suitable photoinitiators include but are not limited to aromatic ketones, benzil ketals, benzoin and benzoin ethers and phosphine oxides. Examples of the photoiniators non-exclusively include benzophenone, benzyl dimethyl ketal, benzoin alkylyl ethers, 1-hydroxy-cyclohexyl-phenyl ketone, benzodimethyl ketal, α,α-dimethyloxy-α-hydroxy acetophenone, 1-[4-(2-hydroxyethoxy)phenyl]-2-hydroxy-2-methyl-propan-1-one, 2-methyl-1-[4-methylthio)phenyl]-2-morpholino-propan-1-one, 2-benzyl-2-dimethylamino-1-(4-morpholinophenyl)-butan-1-one and 2,4,6-trimethylbenzoyldiphenylphosphine oxide. The preferred photoinitiator composition is a mixture of at least two photoinitiators with different extinction coefficients and absorption maxima. Such a mixed photoinitiator composition enables high photo contrast as well as fast curing speed. Examples of such mixtures include, but are not limited to, benzodimethyl ketal with α,α-dimethyloxy-α-hydroxy acetophenone and 2,4,6-trimethylbenzoyldiphenylphosphine oxide with α,α-dimethyloxy-α-hydroxy acetophenone.

Optional additives may be added to the photosensitive composition to enhance certain properties such as thermal stability, chemical stability, coating quality, and photo contrast. Examples of the additives include, but are not limited to, surfactants, contrast enhancers, photostabilizers, UV absorbers, antioxidants and dyes. Examples of surfactants include fluorinated surfactants such as Fluorad from 3M of St. Paul, Minn. and polyethers such as BYK-3500 from BYK Chemie USA of Wallingford, Conn. Suitable contrast enhancers include free radical scavengers, particularly photo bleachable free radical scavengers such as the nitrones reported in U.S. Pat. No. 6,162,579. Photostabilizers include hindered amines such as Cyasorb UV3346 from Cytec Industries of West Paterson, N.J. and TINUVIN 123S from Ciba Specialty Chemicals of Tarrytown, N.Y. UV absorbers include benzotriazoles such as TINUVIN 234 from Ciba Specialty Chemicals and benzophenone derivatives such as UVINUL from BASF of Mount Olive, N.J. Antioxidants include, for example, hindered phenols such as Irganox 1010 from Ciba Specialty Chemicals. Dyes include methylene green, methylene blue and the like.

Figure 1B:
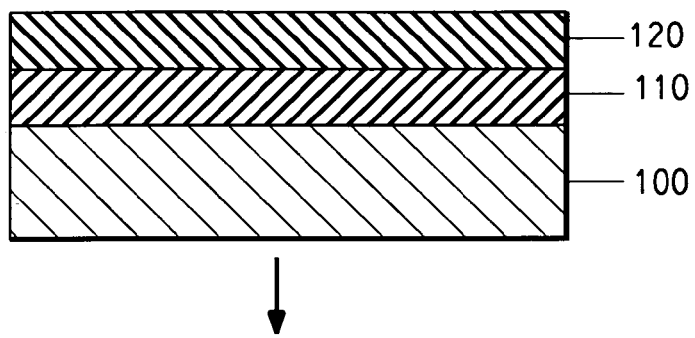
Figure 1C:
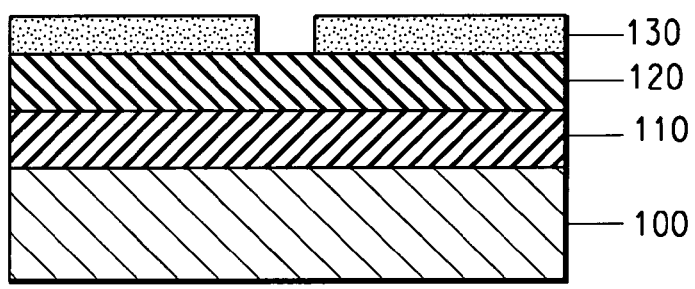
Figure 1D:
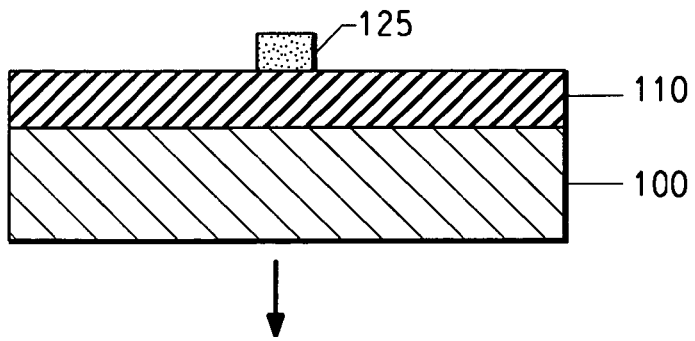
Figure 1E:
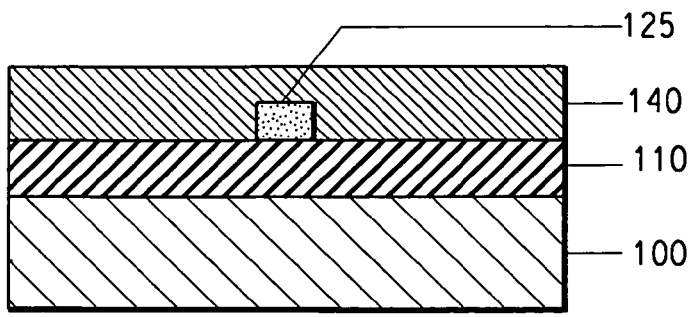

According to the second embodiment of this invention a waveguide device is fabricated by patterning the photosensitive composition of this invention. Preferably the photosensitive composition is patterned with an actinic radiation, preferably UV light. The process of waveguide fabrication with UV light is illustrated in FIG. 1 and non-exclusively includes the following steps:

a) forming a thin layer of a first composition on a substrate 100 to form a bottom cladding layer 110 with a first refractive index, $n_1$;

b) coating a thin layer 120 of a second composition using the photosensitive composition of this invention on top of layer 110;

c) patternwise expose layer 120 to an actinic radiation using a photomask 130 to form a latent image;

d) removing the non-exposed region with an organic solvent to form a waveguide rib 125 with a second refractive index, $n_2$, that is higher than $n_1$; and e) coating a thin layer of a third composition on top of layer 110 and 125 to form a top cladding layer 140 with a third refractive index, $n_3$, that is lower than $n_2$.

The substrate may be any material including silicon, silicon oxide, gallium arsenide, silicon nitride, metal, metal oxide, glass, quartz, plastics, rubbers, ceramics, crystals and the combinations thereof. Optionally the substrates are treated with primers and adhesion promoters to enhance the adhesion between the substrate and the waveguide structure. Also optionally the substrates are coated with an anti-reflective coating layer to reduce effects of back reflection and improve device performance.

Although the bottom and top cladding layers can be made of any materials as long as they have lower refractive index than the core layer, it is preferred that all the three layers are formed using varied photosensitive compositions of this invention. The bottom cladding layer and the top cladding layer may have the same or different compositions. They may have the same or different refractive indexes but they both have refractive indexes lower than that of the core layer. The refractive index of the photosensitive composition can be tailored by adjusting the ratios among all the components, particularly the ratio among the acrylates used.

The actinic radiation used can be any light in the visible or ultraviolet regions of the spectrum as well as electron beam. Preferably the actinic radiation is UV light. The UV sources, wavelengths, intensity and exposure procedures may be varied to achieve the desired curing degree, waveguide geometry and other factors known to those skilled in the art. Useful UV sources are high pressure xenon or mercury-xenon arc lamps fitted with appropriate optical filters.

After the photosensitive composition has been cured to form the predetermined pattern the pattern is developed with a solvent. Examples of development methods include, but not limited to spray, flushing and puddle developing. Many solvents such as alcohols, ketones, ethers and esters are suitable as developers for this invention. Examples of the developers include acetone, methyl ethyl ketone, methanol, ethanol, isopropanol, ethyl acetate, tetrahydrofuran, perfluoroethers and mixtures thereof.

Although only one type of optical device is described in detail in this disclosure many other types of devices can be fabricated using the photosensitive composition of this invention. These include thermo-optic devices, electro-optic devices and magneto-optic devices such as but not limited to couplers, switches, attenuators, filters, multiplexers, demultiplexers, isolators, circulators, chromatic dispersion compensators, polarization mode dispersion compensators, wavelength converters, modulators, lasers, amplifiers, and detectors.

Prior art disclosures have taught the fabrication of thermo-optic devices and their use in fiber optic networks. See for example M. B. J. Diemeer, Optical Materials 9 (1998) 192 and references therein. In a typical thermo-optic device a resistive heater deposited on a waveguide structure is used to heat part of the structure. The refractive index of the heated part changes with increasing temperature. This index change is used to switch, attenuate or tune light transmitted through the waveguide structure. A thermo-optic device can be produced using the photosensitive composition and waveguide device of the present invention by employing a resistive heater.

An optical grating device can also be produced using the photosensitive composition of the present invention. Gratings are wavelength filter elements, and they can be Bragg gratings or diffraction gratings. A Bragg grating is obtained by alternating in a waveguide the refractive index periodically about an average effective refractive index, creating an in-line series of weakly reflecting mirrors. The cumulative effect of the mirrors is to maximally reflect a certain wavelength. Such grating devices can be used as optical filters. When thermo-optic tuning is desired, a resistive heater can be placed in the proximity of the grating. The refractive index in the grating changes with temperature, causing the reflected wavelength to change.

EXAMPLES

The following non-limiting examples are given only for the purpose of illustrating this invention. Variations in composition, synthetic methods and waveguide fabrication methods will be apparent to those skilled in the art and are considered within the scope of this invention.

Analytical Measurement Methods:

Shrinkage: A layer of liquid composition (about 10 m thick) is coated onto a silicon wafer. The thickness of the liquid ($d_L$) is measured with a Filmetrics F20 thickness tester (available from Filmetrics, San Diego, Calif.). The liquid coating is exposed to 10 mJ/cm² UV light under nitrogen using an 800 W mercury xenon lamp. The thickness of the solid film ($d_S$) obtained is measured again with the Filmetrics tester. The shrinkage (S) is calculated using the following equation:

$$S = 1 - d_S/d_L$$

Viscosity: The viscosity is measured by a Brookfield LV-DV viscometer at 23° C. using a standard operating procedure recommended by the manufacturer.

Optical loss: The composition is filtered through 1 and 0.2 m filters. After the filtering the sample is transferred to 0.2 cm, 0.5 cm and 1.0 cm quartz cuvettes and allowed to stand under ambient conditions to remove bubbles. Once the bubbles disappear the samples are analyzed with a near-infrared (NIR) spectrophotometer. The transmission (T) at 1550 nm is recorded and converted to absorption in dB using the following equation:

$$\text{Abs(dB)} = -10 \log(T)$$

Optical loss at 1550 nm (dB/cm) is obtained from the slope of a plot of Abs (dB) against the light path length (cm).

Synthesis of Acrylate Monomers and Polymers

The following scheme depicts a specific method for the synthesis of a fluorinated multifunctional alcohol F and its acrylate G as described in Examples 1 and 2, respectively.

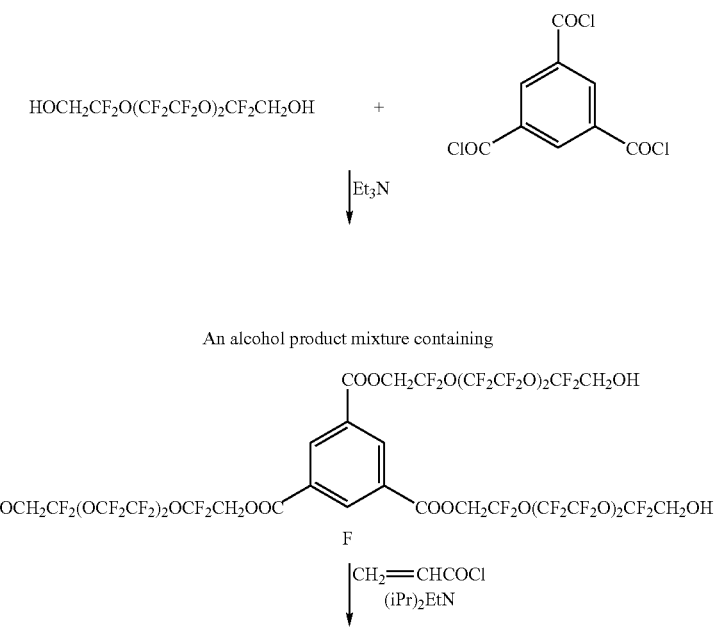

-continued
An acrylate product mixture containing

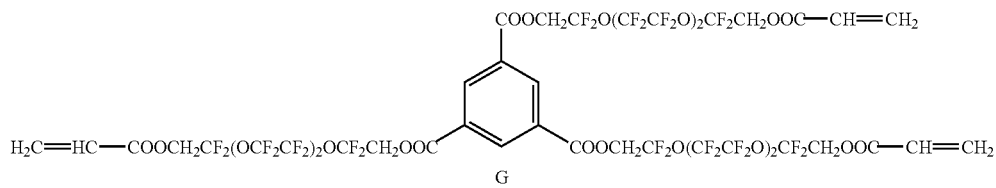

G

It is noteworthy that the molecular structures in the alcohol mixture, F, and the acrylate mixture, G, are for illustration only and only represent the structures of one of the molecules in the product mixtures. For example, some alcohols in F can contain more than one 1,3,5-benzenetricarbonyl core and more than three fluorinated tetraethylene oxide segments (as shown in the following structure) due to di-, tri- or poly-condensation.

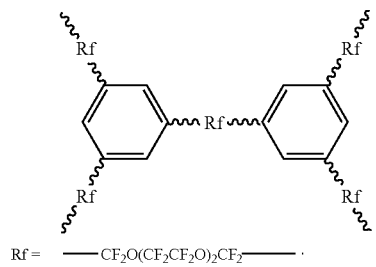

Rf = —CF$_2$O(CF$_2$CF$_2$O)$_2$CF$_2$—.

Example 1

One equivalent of 1,3,5-benzenetricarbonyl trichloride and 4.5 equivalents of 1H, 1H, 8H, 8H-perfluorotetraethyleneglycol were dissolved in anhydrous ether (0.2 M 1,3,5-benzenetricarbonyl trichloride solution) in a cooled, argon-inerted three-neck flask while stirring. The flask was cooled with an ice-water bath. To this reaction mixture was added dropwise 3 equivalents of anhydrous triethylamine. After addition of triethylamine the mixture was stirred 2 hours at room temperature. The mixture was filtered through Celite to remove salt. The filtrate was concentrated to remove ether solvent and then vacuum distilled at 90° C., 0.1 mmHg to remove the unreacted 1H, 1H, 8H, 8H-perfluorotetraethyleneglycol. A viscous fluorinated liquid alcohol was obtained.

Example 2

The alcohol prepared in Example 1 and 200 ppm hydroquinone were mixed in anhydrous t-butylmethylether (at 0.5 M hydroxyl group) in an argon-inerted three neck flask. To this reaction mixture was added 1.2 equivalents of acryloyl chloride for each equivalent of hydroxyl group. Then 1.15 equivalents of anhydrous diisopropylethylamine was added dropwise with stirring. The reaction mixture was stirred for 10 h at room temperature. The reaction mixture was then quenched with 0.3 equivalent of methanol and stirred for 2 h to neutralize excess acryloyl chloride. The mixture was filtered through Celite/silica to remove salt. The filtrate solution was concentrated and pumped under vacuum at 60° C. to yield a liquid acrylate, F12C8-3S-A. The crude product was then treated with 2% activated activated carbon to remove a light yellow color. F12C8-3S-A has a refractive index $n_D^{23}$ of 1.384 and viscosity at 23° C. of 2200 cP.

Example 3

One equivalent of 1,3,5-benzenetricarbonyl trichloride and 4.5 equivalents of Fluorolink D10, a fluorinated polyether diol commercially available from Ausimont USA, were dissolved in anhydrous t-butylmethylether (0.08 M 1,3,5-benzenetricarbonyl trichloride) in an argon-inerted three-neck flask with stirring in an ice-water bath. To the reaction mixture was added dropwise 3 equivalents of anhydrous diisopropylethylamine. After addition of the diisopropylethylamine the mixture was stirred for 2 hours at room temperature. Then 7.2 equivalents of acryloyl chloride were added to the stirred mixture, followed by 6.9 equivalents of anhydrous diisopropylethylamine. The reaction mixture was stirred for an additional 6 h at 50° C. Finally the reaction mixture was quenched with 3.6 equivalents of methanol and stirred for 2 h to neutralize excess acryloyl chloride. The mixture was filtered through Celite/silica to remove salt. The filtrate solution was concentrated and pumped under vacuum at 60° C. to yield a liquid acrylate, FLD10-3S-A. The crude product was then treated with 2% activated carbon to remove a light yellow color. The carbon treated FLD10-3S-A has a refractive index $n_D^{23}$ of 1.325 and viscosity of 140 cP at 23° C.

Example 4

One equivalent of 1,3,5-benzenetricarbonyl trichloride and 4.5 equivalents of Fluorolink D10 were dissolved in anhydrous ether (0.2 M 1,3,5-benzenetricarbonyl trichloride) in an argon-inerted three-neck flask while stirring in an ice-water bath. To this reaction mixture was added dropwise 3 equivalents of anhydrous triethylamine. After the addition of the triethylamine the mixture was stirred for 2 h at room temperature. Then the mixture was filtered through Celite to remove salt. The filtrate was concentrated to yield a viscous fluorinated liquid alcohol.

Example 5

One equivalent of trimethyl-1,3,5-benzenetricarboxylate, 0.06 equivalent sodium methoxide and 4.5 equivalents of Fluorolink D10 were mixed in an argon-inerted three-neck flask while stirring. Then the reaction mixture was heated to 115° C. for about 20 h. Reduced pressure (100 mmHg) was used to remove the methanol generated during the reaction. Concentrated HCl in ethyl acetate was added to neutralize excess base. The solution was dried over MgSO$_4$, filtered and concentrated to yield a viscous fluorinated liquid alcohol with a slight yellow color.

Example 6

The alcohol prepared in Examples 4–5 and 200 ppm hydroquinone were mixed with anhydrous t-butyl methyl ether (at 0.5 M hydroxyl group) in an argon-inerted three neck flask. To this reaction mixture were added 1.2 equivalents of acryloyl chloride for each equivalent of hydroxyl group. Then 1.15 equivalents of anhydrous diisopropylethylamine were added dropwise with stirring. The reaction mixture was stirred for 10 h at room temperature. Finally the reaction mixture was quenched with 0.3 equivalent of methanol, stirred for 2 h to neutralize excess acryloyl chloride, and filtered through Celite/silica to remove salt. The filtrate solution was concentrated and pumped under vacuum at 60° C. to yield a liquid acrylate, FLD10-3S-A. The crude product was then treated with 2% activated carbon to remove a light yellow color. The treated FLD10-3S-A has a refractive index $n_D^{23}$ of 1.325 and viscosity of 140 cP at 23° C.

Example 7

One equivalent of 1,2,3,4-butanetetracarboxylic acid, Amberlyst-15 ion-exchange resin (40 wt % of the 1,2,3,4-butanetetracarboxylic acid) and 6 equivalents of Fluorolink D10 were mixed in a three-neck flask, which was fitted with a water collecting apparatus. The reaction mixture was heated to 210° C. until the expected amount of water had been collected. Finally the mixture was cooled to room temperature and filtered through Celite to yield a viscous fluorinated liquid alcohol with a slight yellow color.

Example 8

The alcohol prepared in Example 13 and 200 ppm hydroquinone were mixed with anhydrous t-butyl methyl ether (at a 0.5 M of hydroxyl group) in an argon-inerted three neck flask. To the reaction mixture were added 1.11 equivalents of acryloyl chloride for each equivalent of hydroxyl group. Then 1.1 equivalents of anhydrous diisopropylethylamine were added dropwise while stirring. This reaction mixture was stirred for 10 h at room temperature. Finally the reaction mixture was quenched with 0.4 equivalent of methanol, stirred for 2 h to neutralize excess acryloyl chloride, and filtered through Celite/silica to remove salt. The filtrate solution was concentrated and pumped under vacuum at 60° C. to yield a liquid acrylate, FLD10-4S-A. The crude product was then treated with 2% activated carbon to remove a light yellow color. The treated FLD10-4S-A has a refractive index $n_D^{23}$ of 1.319 and viscosity of 130 cP at 23° C.

Example 9

To a 3-neck flask was added 1 equivalent of 1H, 1H, 8H, 8H-perfluorotetraethylene glycol as an anhydrous ether solution (0.3–0.4 M). To the ether solution was added 2.2 equivalents of anhydrous diisopropylethylamine under argon. While stirring, 2.2 equivalents of acryloyl chloride were added dropwise. The mixture was then stirred for 6–8 h at room temperature. Finally 0.4 equivalent of methanol was added to neutralize excess acryloyl chloride. The resulting mixture was filtered through Celite/silica to remove salt precipitate. The filtrate was concentrated to yield a clear liquid diacrylate, F12-C8-DA. F12-C8-DA has a refractive index $n_D^{23}$ of 1.353 and viscosity of about 15 cP at 23° C.

Preparation of Photosensitive Composition

Example 10

A photosensitive composition was prepared by mixing 66 parts by weight of the FLD10-4S-A prepared in Example 8, 33 parts of the F12-C8-DA prepared in Example 9, and 1 part of the photoinitiator Darocur 1173, available from Ciba Specialty Chemicals. The liquid composition has a refractive index $n_D^{23}$ of 1.333. The liquid composition was cured by UV light under nitrogen. The UV cured film has shrinkage of about 2%, Tg of about −70° C. and CTE of about 290 ppm.

Example 11

A photosensitive composition was prepared by mixing 49.5 parts by weight of the FLD10-4S-A prepared in Example 8, 49.5 parts of the F12-C8-DA prepared in Example 9, and 1 part of the photoinitiator Darocur 1173. The liquid composition has a refractive index $n_D^{23}$ of 1.339 and optical loss of 0.2 dB/cm at 1550 nm. The liquid composition was cured by UV light under nitrogen. The UV cured film has shrinkage of about 2%, Tg of about −60° C. and CTE of about 280 ppm.

Example 12

A photosensitive composition is prepared by mixing 99 parts by weight of the FLD10-4S-A prepared in Example 8, 0.5 part of the photoinitiator Darocur 4265, available from Ciba Specialty Chemicals, and 0.5 part of Darocur 1173. The liquid composition has a refractive index $n_D^{23}$ of 1.321. The liquid composition was cured by UV light under nitrogen. The UV cured film has shrinkage of about 1%, Tg of about −70° C. and CTE of about 300 ppm.

Example 13

A photosensitive composition was prepared by mixing 30 parts by weight of the FLD10-4S-A prepared in Example 8, 17 parts of the F12C8-3S-A prepared in Example 2, 52 parts of the FLD10-3S-A prepared in Example 3, 0.5 part of the photoinitiator Darocur 4265, and 0.5 part of Darocur 1173. The liquid composition has a refractive index $n_D^{23}$ of 1.336 and optical loss of 0.15 dB/cm at 1550 nm. The liquid composition was cured by UV light under nitrogen. The UV cured film has shrinkage of about 1%, Tg of about −70° C. and CTE of about 300 ppm.

Example 14

A photosensitive composition was prepared by mixing 30 parts by weight of the FLD10-4S-A prepared in Example 8, 8 parts of the F12C8-3S-A prepared in Example 2, 61 parts of the FLD10-3S-A prepared in Example 3, 0.5 part of the photoinitiator Darocur 4265, and 0.5 part of Darocur 1173. The liquid composition has a refractive index $n_D^{23}$ of 1.331. The liquid composition was cured by UV light under nitrogen. The UV cured film has shrinkage of about 1%, Tg of about −70° C. and CTE of about 300 ppm.

Fabrication of Waveguides

Example 15

A waveguide device was fabricated with the following process:
a) A 14 μm layer of the photosensitive composition prepared in Example 10 was spin coated onto a silicon wafer. The wafer was exposed to 10 mJ/cm² UV light using a 800 W mercury xenon lamp, with maximum output at 365 nm, to cure the composition and form a solid bottom cladding layer;
b) A 7 μm layer of the photosensitive composition prepared in Example 11 was spin coated on top of the bottom cladding layer. A photomask with desired features was placed above the coating. The wafer was then exposed to 3 mJ/cm² UV light using a 800 W mercury xenon lamp, with maximum output at 365 nm, to cure the composition and form a core layer with a latent image;

c) The imaged core layer was developed with a 4:1 mixed solvent of ethyl acetate and H-Galden ZT-85, a fluorocarbon liquid available from Ausimont USA, to remove the non-exposed region to form waveguide ribs;

d) The wafer was baked for 15 s at 125° C., and further exposed to 10 mJ/cm2 UV light to harden the image;

e) A 15 μm layer of the photosensitive composition prepared in Example 10 was spin coated on top of the developed core layer and the bottom cladding layer. The wafer was exposed to 400 mJ/cm² UV light using a 800 W mercury xenon lamp, with maximum output at 365 nm, to cure the composition and form a solid top cladding layer; and f) The wafer was baked at 130° C. for 1 h to yield a waveguide device.

Although the present invention has been shown and described with respect to several preferred embodiments thereof, various changes, omissions and additions to the form and detail thereof, may be made therein, without departing from the spirit and scope of the invention.

What is claimed is:

1. A photosensitive composition comprising
a) at least one fluorinated non-urethane containing multifunctional acrylate prepared from at least one multifunctional alcohol, said alcohol being synthesized from a core molecule having at least two equivalents of hydroxy-reacting functional groups and a fluorinated molecule having at least two hydroxyl groups; and b) at least one initiator, wherein the non-urethane containing multifunctional acrylate is prepared using the following reaction scheme:

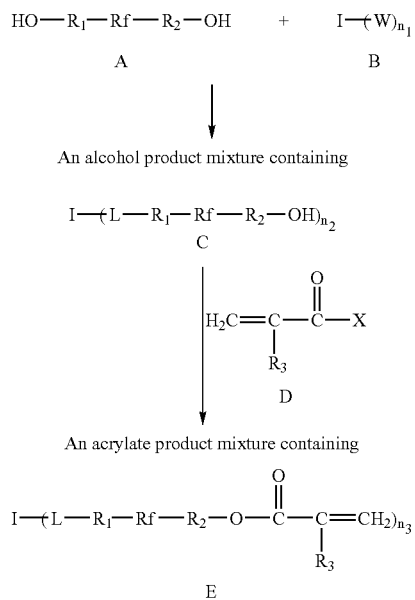

wherein A is a fluorinated monomer or polymer having two hydroxyl groups, wherein $R_f$ is a monomeric or polymeric perfluorinated alkylenediyl, alkylene oxide, arylenediyl, arylene oxide, or mixtures thereof, and $R_1$ and $R_2$ are monomeric or polymeric divalent moieties such as alkylenediyl, alkylene oxide, alkylene sulfide, arylenediyl, arylene oxide, arylene sulfide, siloxane or mixtures thereof; B is a multifunctional molecule wherein I is a multivalent radical, W stands for one equivalent of hydroxy-reacting functional group and $n_1$ is at least 2; C is the multifunctional alcohol product mixture from A and B, wherein L is an ether link and $n_2$ is at least 2; D is an acryloylation agent, wherein X is selected from OH, Cl or alkoxy; and E is the acrylate product mixture from C and D, wherein $R_3$ is H or $CH_3$ and $n_3$ is at least 2, wherein there are at least 2.5 equivalents of OH groups from A for every equivalent of hydroxy-reacting group, W, from B.

2. The photosensitive composition of claim 1 wherein n, (I=1–3) independently ranges from 3 to 6.

3. The photosensitive composition of claim 1 wherein the acrylate E has the formula of:

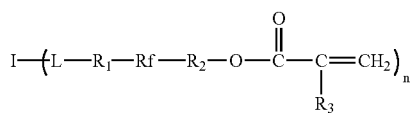

wherein n ranges from 3 to 6.

4. The photosensitive composition of claim 4 wherein Rf is a perfluorinated poly(methylene) moiety having at least 4 carbon atoms.

5. The photosensitive composition of claim 1 wherein Rf is a perfluorinated poly(alkylene oxide) moiety having at least 4 carbon atoms.

6. The photosensitive composition of claim 1 wherein the acrylate has a number average molecular weight of at least 500.

7. The photosensitive composition of claim 1 wherein B is chosen from halides or other compounds that react with alcohols to form ethers.

8. The photosensitive composition of claim 1 wherein B is selected from 1,4-dibromobutane, α,α'-dichloro-o-xylene, α,α'-dibromo-o-xylene, α,α'-dichloro-m-xylene, α,α'-dibromo-m-xylene, α,α'-2,3,5,6-hexachloro-p-xylene, 2,2'-bis(bromomethyl)-1,1-biphenyl, 1,8-bis(bromomethyl)naphthalene, 1,3-dichloro-2-(chloromethyl)-2-methylpropane, 1,1,1-tris(chloromethyl)-propane, 2,4,6-tris(bromomethyl)mesitylene, pentaerythrityl tetrachloride, pentaerythrityl tetrabromide, 1,2,4,5-tetrakis(bromomethyl)-benzene, or hexakis(bromomethyl)benzene.

* * * * *